Nov. 28, 1961   E. C. WHITEHEAD ET AL   3,010,798
CHROMATOGRAPHIC ANALYZING AND RECORDING APPARATUS AND METHOD
Filed Nov. 21, 1955   2 Sheets-Sheet 1
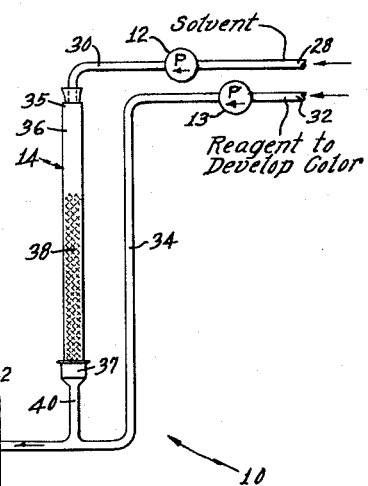
FIG. 1
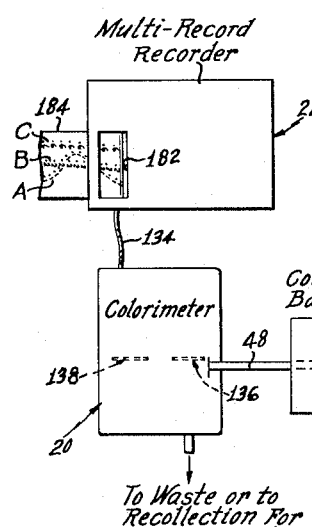
FIG. 2
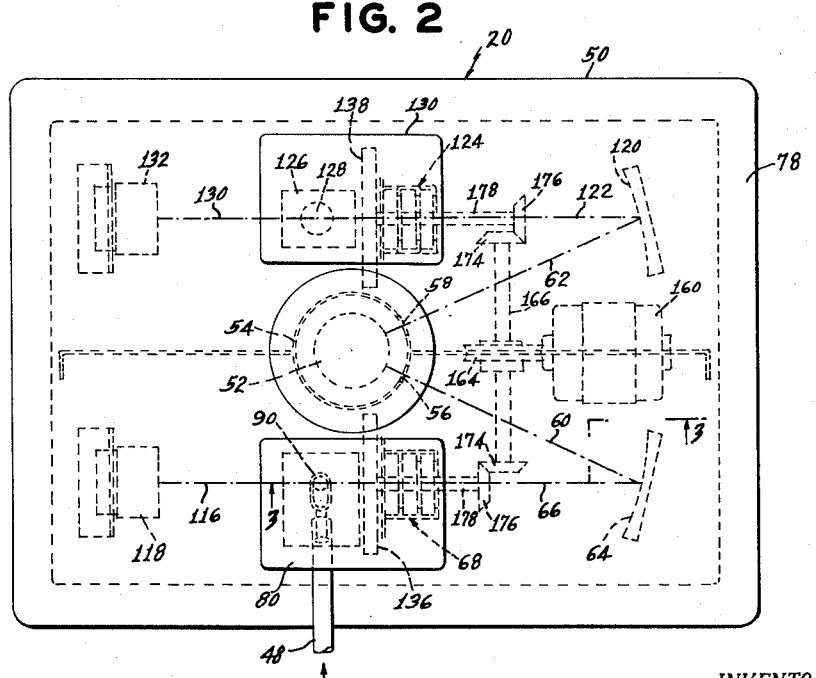
INVENTORS
Edwin C. Whitehead
Andres Ferrari Jr.
BY Jack Isreeli
Edwin Leinoha & Harry Chen
ATTORNEYS

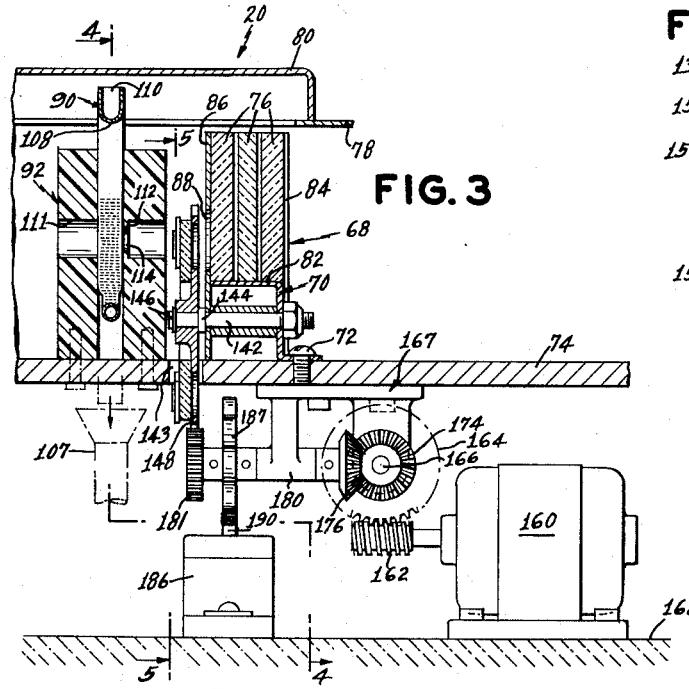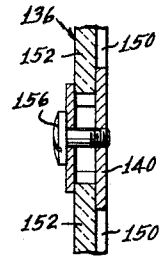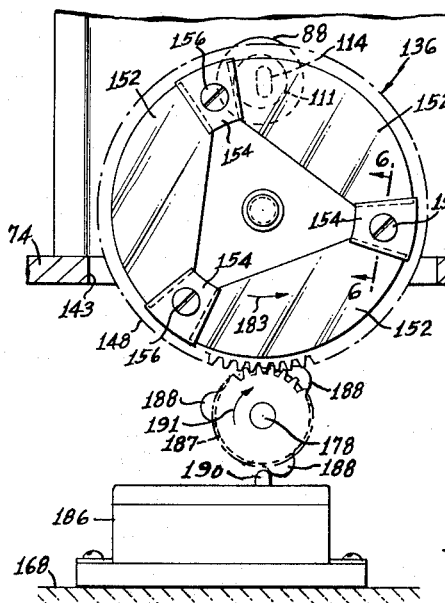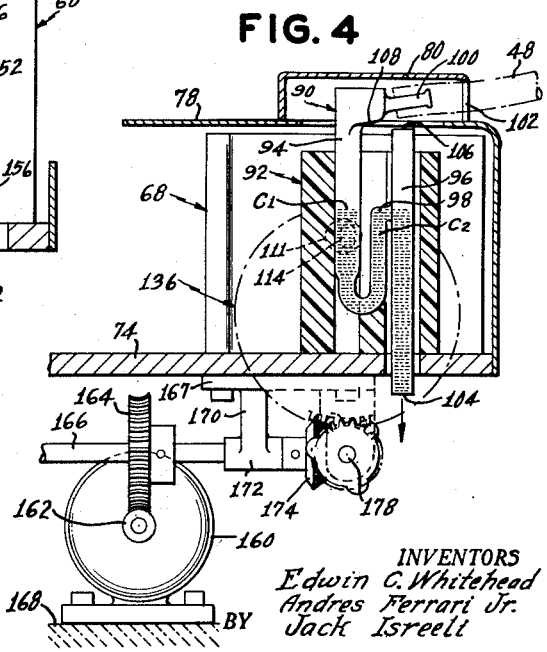

United States Patent Office 3,010,798
Patented Nov. 28, 1961

3,010,798
CHROMATOGRAPHIC ANALYZING AND RECORDING APPARATUS AND METHOD
Edwin C. Whitehead, Crestwood, Andrés Ferrari, Jr., Scarsdale, and Jack Isreeli, Tuckahoe, N.Y., assignors, by mesne assignments, to Technicon Chromatography Corporation, Chauncey, N.Y., a corporation of New York
Filed Nov. 21, 1955, Ser. No. 548,037
7 Claims. (Cl. 23—230)

The present invention relates generally to the art of chromatography and, in particular, to a chromatographic analyzing and recording apparatus.

An important technique in chromatographic analysis is the procedure involving the formation of a liquid chromatogram. According to "Principles and Practice of Chromatography," by Bechmeister and Cholnoky, published by John Wiley and Sons, Inc., New York, New York, the procedure is to introduce the material to be analyzed, namely the adsorbate, into the chromatograph column and thereafter to drive successive portions of the adsorbate through the adsorption column and to collect the separate fractions in the eluent by appropriate changes of the receiver. More particularly in accordance with conventional practice, the adsorbate which ordinarily comprises a plurality of different component substances having different affinities respectively, for the adsorbent material in the chromatography column 14 is first introduced into the column. As a result of the different affinities of the adsorbate components for the adsorbent in the column, the various adsorbate components stratify downwardly in the column in the order of their degrees of affinity, the component having the greatest affinity for the adsorbent being uppermost in the column of adsorbent material and the component having the lowest affinity being lowermost in the column.

After the adsorbate is thus stratified in the chromatography column, a liquid which for convenience may be referred to as a solvent is introduced into the column at the top thereof and flows downwardly through the column, and in so doing forms a series of eluents which discharge from the outlet at the bottom of the column. The solvent, in passing downwardly through the column, at a constant rate of flow, removes the adsorbate components from the adsorbent material seriatim from top to bottom of the column, i.e., as the solvent stream flows downwardly through the column, all of the first or top adsorbate in the column is removed by the first part of the solvent stream. As said first part of the solvent stream is saturated with said first adsorbate component, it does not receive any of the other adsorbent components, but the next segment of the solvent stream accepts, and becomes saturated with the next adsorbent in the column, and so on until all of the adsorbate components are removed by the solvent in successive portions thereof during the flow of the solvent downwardly through the column. Heretofore a series of fractions of the eluent of each adsorbate were received, in carefully measured volumes, respectively, in a series of test tubes. Thereafter, each fraction in the multiplicity of test tubes, respectively, is separately subjected to analysis and study for determining concentration or other characteristics thereof.

The manual collection of the fractions is a costly and time-consuming procedure, and in which it is difficult, if not impossible, to provide exactly equal fractions in the various receivers. A high degree of equality of the fractions may be obtained through the utilization of an automatic fraction collection apparatus, such as that shown, for example in the patents to Gorham Nos. 2,604,248, 2,604,249 and 2,654,522, which obviates the disadvantages of the manual collection of the fractions. However, in either case, whether the fractions are collected manually or by an automatic apparatus, the necessity still exists to separately handle and analyze each and every fraction of the adsorbate component for the particular characteristic or quality thereof which is being investigated. This analysis involves, in addition, the separate treatment of each of the fractions so that each of the particular characteristic or quality thereof can be ascertained. This results in a relatively time-consuming and costly procedure. Therefore, it is an object of the present invention to obviate the foregoing disadvantages of the prior art in chromatographic analysis.

Another object of the invention is to obviate the necessity for the collection of separate discrete fractions in different test tubes for the formation of a liquid chromatogram.

Another object is to provide for the continuous treatment and analysis of the eluents so as to obviate the necessity for the separate handling of each eluent in the treatment and analysis thereof.

Another object is to provide a completely automatic apparatus for the formation and analysis of a liquid chromatogram.

Another object is the provision of a highly novel technique for the formation and analysis of a liquid chromatogram.

The above and other objects, features and advantages of the present invention will be more fully understood from the following description considered in connection with the accompanying illustrative drawings.

In the drawings which illustrate the best mode presently contemplated by us of carrying out the invention:

FIG. 1 is a schematic and diagrammatic illustration of a recording chromatographic apparatus pursuant to the present invention;

FIG. 2 is a top plan view of the colorimeter utilized in the apparatus of FIG. 1, various components of the colorimeter being illustrated more or less diagrammatically;

FIG. 3 is a sectional view, on an enlarged scale, taken on the line 3—3 of FIG. 2;

FIG. 4 is a sectional view taken on the line 4—4 of FIG. 3;

FIG. 5 is a sectional view, on an enlarged scale, taken on the line 5—5 of FIG. 3; and FIG. 6 is a fragmentary sectional view taken on the line 6—6 of FIG. 5;

Referring to the drawings in detail, and especially to FIG. 1, the recording chromatographic apparatus of the present invention is indicated generally by the reference numeral 10. As here shown, said apparatus comprises pumps 12 and 13, a chromatography column 14, a heating bath 16, a cooling bath 18, an analyzing device or colorimeter 20, and a recorder 22.

The pump 12 is connected by means of the inlet conduit 28 to a supply of a suitable solvent or eluting liquid (not illustrated) to pump said liquid through the conduit 30 to the inlet 35 at the top of the chromatography column 14. The pump 13 is connected by means of the inlet conduit 32 to a supply of a suitable color developing reagent (not illustrated) to pump the reagent into the conduit 34. In lieu of separate pumps 12 and 13, any suitable fractionating pump may be used to provide predetermined quantities of solvent or analysis liquid and reagent to the conduits 30 and 34, respectively, at predetermined rates during the operation of the apparatus 10.

The chromatography column 14 is a conventional component used in chromatographic analysis. As here shown, provision is made for a chromatography tube 36 provided with a column of suitable adsorption material. In accordance with conventional practise in chromatography analysis, the liquid to be analyzed is introduced into the tube 36, through the upper end thereof, before the solvent is introduced into the column by the pump 12. More specifically, the components of the liquid to be analyzed stratify in the column according to the degree of affinity of each of the several components for the adsorbent material in the column and form layers of adsorbates in the order of their respective affinities, from top to bottom of the column, the adsorbate of highest affinity being uppermost in the column. Thereafter a solvent or eluting liquid is continuously applied during operation of the pump 12 to the upper end 35 of the column tube 36, the resultant eluents passing from the outlet 37 of the adsorption column into the conduit 40 which communicates with the conduit 34. The stream of eluents which flow from the bottom of the column through the outlet 37 contains the adsorbate components of the column in the order of their affinities for the adsorbent, i.e., the first eluent in the stream passing through the outlet 37 consists of the adsorbate of the top of the column and the succeeding elements are constituted in succession by the successive lower adsorbates, respectively, of the column. Heretofore carefully measured fractions of these eluents were collected in a multiplicity of test tubes and thereafter subjected individually to colorimetric analysis for analyzing the liquid in respect to its several constituents. This tedious and stepwise method of analysis is obviated in accordance with this invention, as is evident from the preceding and following description. Thus, instead of collecting carefully measured fractions of the eluent from the column in a multiplicity of individual test tubes, as described, for example in the above mentioned Gorham patent, and subsequently individually treated for colorimeter analysis, the eluent from the column containing the adsorbate components in succession in the eluting liquid, flows through the conduit 40 and a color developing reagent is supplied by pump 13 and flows through tube 34, which is connected to tube 40, and mixes with the eluent stream from the tube 40. The pump 13 is dimensioned and operated so as to provide the proper amount of reagent material for mixture with the eluents as the latter issue from the adsorption column, depending upon the particular material being analyzed and the particular material in the adsorption column.

Where heat is necessary to effect the chemical reaction between the reagent and the eluents for the development or production of a color change in the mixture of the two, the mixture is fed to a heating bath 16. Heating bath 16 may be of any conventional construction suitable for the purpose wherein the material to be heated is passed through a conduit 42 which is immersed in water maintained at a predetermined heating temperature by a suitable heating means. Where the heating bath is used, it is preferable to cool the mixture before it is analyzed and in this connection provision is made for the conduit 44 which extends from the conduit 42 of the heating bath to a conduit 46 provided in the cooling bath 18. The cooling bath 18 may be of any conventional construction suitable for the purpose, in which the conduit 46 is immersed, preferably in water, maintained at a predetermined temperature lower than the temperature of the heating bath for the purpose of cooling the mixture to the desired temperature. It will be understood that where the desired color change can be produced in the mixture of the eluents and the color developing reagent without the necessity of heating said mixture, both the heating bath 16 and the cooling bath 18 may be eliminated in which case the conduit 34 would extend from its junction with conduit 40, directly to the colorimeter 20.

The colorimeter 20 is preferably of the double-beam type illustrated and claimed in the copending application of Seymour Rosin, Serial No. 491,885, filed March 3, 1955, now abandoned, and assigned to the assignee hereof. As illustrated herein, the double-beam colorimeter 20 comprises a housing or enclosure 50 in which there is provided a suitable light source 52. The light source 52 is mounted within a light shield 54 which completely encloses the latter. The shield is provided with a pair of light apertures 56 and 58 for the passage therethrough of the light beams 60 and 62, respectively. The light beam 60 is directed at a concave mirror 64 which reflects and focuses the beam, as at 66, at a stationary filter holder assembly 68. As best illustrated in FIG. 3, the filter holder assembly 68 comprises a filter holder 70 suitably mounted on the bottom wall 74 of the colorimeter 20, as by securing elements 72. A plurality of light filters 76 are removably mounted in the filter holder or bracket 70. In this connection, it will be noted that the upper wall 78 of the housing 50 is provided with a cover 80 for access to the filter holder 70. The filters 76 are removably seated on the bottom wall 82 of the bracket 70 between the open front 84 thereof and the rear wall 86 thereof. Said rear wall is provided with a light aperture 88 so that the light beam 66, focused by the mirror 64, passes through the open front 84 of the filter bracket 70, through the filters 76, and through the light aperture 88.

Rearwardly of the filter holder 70, in the direction of travel of the reflected light beam 66, provision is made in the colorimeter 20 for a light exposure device or continuous flow cell 90, preferably of the type illustrated and claimed in the copending application of Andres Ferrari, Jr., a co-inventor hereof, Serial No. 516,300, filed June 17, 1955, now Patent No. 2,983,184, and assigned to the assignee hereof. As best illustrated in FIGS. 3 and 4 herein, the bottom wall 74 of the enclosure 50 mounts a holder 92 for the flow cell 90. The holder 92 is formed of suitable material, preferably a suitable plastic, which is colored black so as not to reflect light. The flow cell 90 is made preferably of glass and is mounted within the holder 92.

As here shown, the flow cell 90 is provided with an inlet arm 94 and an outlet arm 96 interconnected by a neck 98 which extends from the bottom of the inlet arm 94 upwardly to the outlet arm 96. The inlet arm 94 is provided with an inlet nozzle 100 which is connected to the conduit 48 which extends from the cooling bath 18 through an aperture 102 provided in the cover 80. The outlet arm 96, at its lower end, terminates in an outlet or discharge spout 104, and at its upper end is provided with a vent opening 106. It will be noted that the U-shaped neck 98 between the inlet arm 94 and the outlet arm 96 defines a reflexed fluid path for flow of the mixture through the cell 90 from the inlet spout 100 to the outlet spout 104 from which the mixture is discharged into a drain 107. This fluid passageway forms the liquid within the flow cell 90 into the pair of balanced columns C1 and C2, as illustrated in FIG. 4. The design and construction of the flow cell 90 is such that liquid motion or movement within the columns is minimized. In this connection, it will be noted that the inlet nozzle 100, being laterally offset from the column C1, prevents the liquid from falling directly into the column C1 but causes said liquid to flow along the inclined inner surface portion 108 adjacent the nozzle, and then along the inner surface of the arm 94 into the column C1. This prevents such agitation or turbulence in the liquid column C1 as could result if the liquid entering the flow cell 90 falls directly into said column. The vent opening 106 subjects the liquid in the column C2 in the neck 98 to the atmospheric pressure and the arm 94 is provided, at the upper end thereof, with a vent opening 10. The columns C1 and C2 being balanced in the flow cell 90 and both being subjected to the atmospheric pressure through the described vent openings, the hydrostatic pressures of the columns are in equilibrium and, consequently, surging of the liquid between the columns is eliminated, as the liquid flows out through the spout 104, so as to minimize the movement of the liquid in the column C1.

The liquid in the column C1 is subjected to the light beam 66. For this purpose, the holder 92 is provided with a transverse bore 111 which is aligned with the light aperture 88 in the filter holder 70. Said bore is provided with a portion 112 of reduced diameter, against which the arm 94 of the flow cell 90 abuts to define a reduced light aperture 114 at which the light beam 66 is focused for exposing the liquid in column C1 to said light beam. It will be noted that the bore 111 extends completely through the holder 92 so that the light passing through the column C1 emerges from the holder 92, as best indicated at 116 in FIG. 2. A photo-electric device 118 is positioned in the path of the light beam 116 and is energized thereby.

Referring now to the second beam 62 which emanates from the light source 52, it will be noted from FIG. 2 that the beam 62 is directed at a reflecting and focusing mirror 120 which serves to focus the light into a beam 122 directed at a stationary filter bracket or holder assembly 124 which in all respects is similar to the previously described stationary filter assembly 68. Rearwardly of the filter assembly 124, in the direction of travel of the light beam 122, provision is made for a suitable holder or support 126 which has provision to mount or contain a suitable standard 128. As is well known in the art of colorimetry, the standard 128 may be constituted by a suitable liquid or by other light permeable material, provision being made on the upper wall 78 of the enclosure 50 for a cover 130 for access to the filter assembly 124 and the standard 128. It will be understood that the holder 126 is provided with a transverse bore, as in the case of the holder 92, in which there is defined a light aperture similar to the previously described light aperture 114 at which the light beam 122 is focused. The light beam 122 emerges from the holder 126, as indicated at 130, and a photo-electric device 132 is positioned so as to intercept and be energized by the light beam 130.

The outputs of the photo-electric devices 118 and 132 are applied through the cable 134 to the recorder 22. The recorder 22 is a multiple-record recorder of conventional construction which, in the presently preferred embodiment of the invention, has provision for making three separate records. Such recorders are commercially available, being manufactured, for example, by the Bristol Company, Waterbury, Connecticut, and may be of the type described in their bulletin P1245 of November 1951. These commercially available recorders are provided with a continuous-balance null-type measuring circuit including either a self-balancing potentiometer or bridge. However, since the colorimeter 20 is of the double-beam type, as previously described, it is necessary to modify the commercially available recorder by substituting for the continuous-balance null-type measuring circuit thereof a light comparator circuit of the type illustrated and described in copending application of Milton Pelavin, Serial No. 491,913, filed March 3, 1955, and assigned to the assignee hereof, the outputs of the photo-electric devices 118 and 132 being applied to said light comparator circuit of the recorder.

Pursuant to a feature of the present invention, the color developed mixture flowing through the colorimeter 20 is subjected continuously to a plurality of separate analyses each of which is recorded by the recorder 22. In this connection, provision is made for the rotating filter assemblies 136 and 138. These assemblies are similar in construction, the filter assembly 136 being interposed in the path of the light beam 66 before it reaches the continuous flow cell 90, and the filter assembly 138 being interposed in the path of the light beam 122 before the latter reaches the standard 128. As best illustrated in FIGS. 3, 5 and 6 in detail, which illustrate the filter assembly 136, said assemblies each comprises a disk 140 which is mounted for rotation on a shaft 142 carried by the filter bracket 70 below the seat 82 which mounts the stationary filters 76. The disk 140 is mounted between a collar 144 and a retainer 146 provided on the shaft 142. The disk extends through a slot 143 in the bottom wall 74 of the colorimeter and at its periphery, the disk 140 is provided with a peripherally continuous gear 148. Inwardly of the gear, the disk is provided with cut-outs or apertures 150. As here shown, provision is made for three cut-outs 150 each of which, during rotation of the disk, is successively interposed between the light apertures 88 and 112, as best illustrated in FIG. 3. Each disk aperture 150 may readily be covered by a light filter 152. In this connection, provision is made for the three holder plates 154, each of which overlies the adjacent ends of a pair of filters 152, each plate being removably secured in position on the disk 140 by a screw 156 which extends through the plate and is threaded into the disk 140 between the adjacent ends of a pair of light apertures 150.

In order to effect the rotation of the filter assemblies 136 and 138, provision is made for a motor 160 which drives the worm 162. The worm 162 meshes with a worm wheel 164 which is keyed to the shaft 166. The enclosure 50 of the colorimeter 20 is suitably mounted in spaced relation above the support 168 on which the motor 160 is mounted. The bottom wall 74 of the enclosure 50 is provided, on the outer surface thereof, with a pair of similar brackets 167 below the stationary filter holder assemblies 68 and 124, respectively, of which the bracket below the stationary filter holder associated with the flow cell 90 is illustrated, the other bracket not being illustrated but being similar in construction to the illustrated bracket. Said brackets are each provided with a depending arm 170 which is provided with a bearing 172 in which the shaft 166 is journalled. At each end thereof, the shaft 166 mounts a bevel gear 174 which meshes with a companion bevel gear 176. The bevel gears 176 are each provided on one end of a shaft 178 which is journalled in a bearing arm 180 provided on the associated bracket 167. Consequently, it will be apparent that the motor 160 through the worm gear drive 162—164 drives the shaft 166 which in turn, through the bevel gears 174, at the opposite ends, respectively, thereof, drives the bevel gears 176. Said gears 176 drive the pair of parallel shafts 178, which are mounted at right angles to the main shaft 166, as best illustrated in FIG. 2. At the other end thereof, each shaft 178 is provided with a spur gear 181 which meshes with the associated spur gear 148 provided on the adjacent filter disk 140.

In view of the foregoing, it will be apparent that the filter wheels or rotatable filter assemblies 136 and 138 are driven by the motor 160, at the same rate, through the described gearing so as to rotate in the direction of the arrow 183 in FIG. 5. Said rotation of the filter assemblies successively interposes a filter 152 on the filter assembly 136 between the light aperture 88 in the stationary filter assembly 68 and the light aperture 114 associated with the continuous flow cell 90. In the case of the rotary filter assembly 138, the filters 152 thereof are similarly successively interposed between the light aperture 88 in the stationary filter assembly 124 thereof and the light aperture provided in the standard housing 126 through which the reflected beam of light 122 passes. Consequently, it will be readily apparent that each of the reflected beams 66 and 122, in addition to passing through the filters provided in a stationary filter holder, also each pass through the filters of the associated rotary filter assembly before energizing the associated photo-electric device.

The combinations of filters in the fixed filter holder assemblies 68 and 124, respectively, limit the light, transmitted thereby to the associated photo-electric device, to a predetermined band width. The filters 152, provided on the rotary filter holders, are of different light transmitting characteristics, each serving to select light of a particular wave length, within the predetermined band, for transmission to the associated photo-electric device. Consequently, in the arrangement shown, with the filters 152 of the rotary filter assembly 136 each operable to transmit a different wave length within the selected band, and with a similar set of filters 152 in the filter assembly 138, it will be apparent that the liquid column C1 in the continuous flow cell 90 is continuously subjected to the successive transmission of light of three different wave lengths, respectively, and that the standard is simultaneously continuously subjected to the successive transmission of light at the same three wave lengths. In this connection, it will be understood that the rotary filter assemblies 136 and 138 are so synchronized and adjusted that at any instant, the particular filters 152 which are in light transmitting position in each of said assemblies have exactly the same light transmitting characteristics. It is within the scope of the present invention to entirely dispense with the stationary filter assemblies 68 and 124 and it is also within the scope of the present invention to provide a greater or a lesser number of filters 152 on each of the rotary filter assemblies 136 and 138.

As previously indicated, the multiple-record recorder 22 is of conventional construction, being well known in the art as a multi-point recorder. As illustrated and described in the previously identified Bristol Company bulletin, the recorder 22 includes a printing mechanism 182 consisting of an engraved print-wheel and inking-pad assembly. In practicing the present invention, the printing mechanism is adjusted to make three records, printing a different number or symbol for each record, corresponding to the three sets of filters 152 on the rotary filter assemblies 136 and 138, so as to provide a separate recording associated with each set of said filters. Three such records are shown printed on the record sheet 184, the record A comprising printed dots numbered one, the record B comprising printed dots numbered two, and the record C comprising printed dots numbered six.

The multi-record recorder 22 is provided with conventional mechanism to move its print-wheel transversely of the record sheet or chart 184 in accordance with signal output from the photo-electric devices 118 and 132 applied through the previously mentioned light comparator circuit. The motor 160 is operated to rotate the filter wheels 136 and 138 in synchronism with the printing cycle of the recorder 22. In this connection, it will be understood that the recorder 22, as is well known to those skilled in the art, includes a synchronous motor (not illustrated) to drive or rotate the print-wheel to present the various different engraved symbols thereof to the record sheet. The filter wheels 136 and 138 are rotated by motor 160 in synchronism with said rotation of the print-wheel. In this manner each set of companion filters on the wheels 136 and 138 is related to a specific printing symbol on the print-wheel.

Pursuant to the present invention, the recorder 22 is energized in synchronism with the operation of the filter wheels 136 and 138 so that the recorder will be de-energized when the light beams 66 and 122 are intercepted by the opaque holders 154 on the filter wheels, and will be energized when the light beams are intercepted by the translucent filters 152. In this connection the energizing circuit for the recorder includes the normally open micro-switch 186 which is disposed outwardly of the recorder and is connected thereto by the cable 134. As here shown, provision is made for the cam 187 which is keyed to the shaft 178 through which the rotary filter disk 136 is operated. The cam 187 is provided with three equally spaced radial lobes 188 which are so positioned thereon as to engage the operating pin 190 of the micro-switch shortly after each filter holder plate 154 of the disk 136 moves out of position between the light aperture 114 in the flow cell holder 92 and the light aperture 88 in the stationary filter holder 68, so as to close the switch 186 to energize the recorder. More specifically, and as best illustrated in FIG. 5 and with the rotary filter assembly 136 rotating in the direction of the arrow 183, it will be noted that the plate 154 immediately to the left of the light aperture 114, viewing said figure, has been removed as an obstruction to the reflected light beam 66 and that the micro-switch pin 190 is now about to be operated by one of the lobes 188 to energize the recorder so that its mechanism prints. Upon disengagement of the pin 190 by the cam 187, the recorder is de-energized and this occurs before the following plate 154, in the direction of rotation of the rotary filter 136, intercepts the light beam 66. When said following plate 154 clears the aperture 114, the next lobe 188 in the direction of rotation of the cam 186, as indicated by the arrow 191, actuates the switch 186 to energize the recorder so that its printing mechanism will print.

In the operation of the chromatographic recording apparatus 10, solvent from a suitable source is supplied by the pump 12 to the chromatographic column 14 in accordance with well known practice in the art of chromatography, so that the solvent will flow through the adsorption material 38 of said column. The pump 13 simultaneously supplies a color developing reagent for mixture with the eluents issuing from the bottom of chromatography column, for the purpose of developing a color change in the eluents corresponding to the density or concentration therein of a particular material for which the eluents are being analyzed. In those cases where it is necessary to heat the mixture of the reagent and eluents in order to develop the color change, the mixture is passed through a heating bath 16 and then through a cooling bath 18 before it passes into the colorimeter 20 through the conduit 48. Where the color change can be developed without the necessity of heating the mixture, the mixture of the eluents and the reagent can flow directly into the conduit 48 omitting the necessity for the passage thereof through the heating bath 16 and the cooling bath 18. The colored mixture flowing through the light exposure device or continuous flow cell 90 is formed into the balanced columns C1 and C2. As the mixture slowly moves through the column C1, it is exposed to the light beam 66 through the constricted light aperture 114 during those periods when the filter holder plates 154 clear the aperture 114, said light beam being transmitted through the stationary filter assembly 68 and the rotatable filter assembly 136. The light beam 116 emerging from the continuous flow cell 90 energizes the photo-electric device 118. Simultaneously with the transmission of the light through the continuous flow cell 90, light beam 122 is being transmitted in exactly the same manner, through the similar stationary filter assembly 124, through the rotating filters of the rotary filter assembly 138 and through the standard 128 so that the light beam 130 which emerges from the standard 128 energizes the photo-electric device 132. In either case, the light beam first passes through the stationary filters disposed forwardly of the associated rotary filter assembly so as to initially limit the band width of the transmitted light, the individual rotary filters 152 further serving to limit the transmitted light to predetermined wave lengths. The arrangement of the filters 152 on each of the rotary filter assemblies is exactly the same so that the light transmitted by each of the beams 66 and 122 is simultaneously intercepted by a filter of the same wave length so that any difference in the energization of the photo-electric devices 118 and 132 will result from a difference in light transmission by the standard 128 and by the mixture in the continuous flow cell 90. A fast rate of rotation of the rotary filters relative to the relatively slow movement of the mixture passing the light aperture 114 is such as to provide for a plurality of viewing or exposures to the light beam 66 of each portion of the mixture as it passes through the continuous flow cell. The differential output of the photo-electric devices 118 and 132 is applied through the previously identified light comparator circuit in the recorder 22 for energizing the printing mechanism 182 thereof to record on the record sheet 184. The print-wheel of the printing mechanism 182 is energized in sequence by operation of the micro-switch 186. The cam 187 provided on the shaft 178 serves to effect the energization of the print-wheel only with the interposition of the filters 152 in front of the light apertures 88 and 114 so as to provide a separate recording or analysis for each filter or wave length. Consequently, with three separate filters, each of a different wave length, provided on the rotary filter assemblies 136 and 138, it will be apparent that each portion of the mixture passing through the continuous flow cell 90 is subjected to a minimum of three different analyses for the three separate wave lengths and each analysis is recorded on the record sheet 184.

In view of the foregoing, it will be apparent that due to the utilization of the continuous flow cell 90 wherein the mixture is continuously exposed to the light beam 66 and is being continuously analyzed, the separate fractions in the filtrate are being continuously analyzed and recorded. This obviates the necessity for collecting the separate fractions in the eluent from the chromatographic column 14 in separate receptacles followed by the individual treatment of the material in each receptacle and thereafter the individual analysis of the material in each receptacle. After the mixture passes through the colorimeter, it issues into the drain 107 which may extend to a waste line or which drain may be utilized for the purpose of collecting the mixture for purposes of storage or future reference.

While the indicating device of the present invention has been illustrated as a multi-print recorder, it will be understood that it is within the scope of the present invention to use other types of recorders, and that it is also within the scope of the present invention to use other types of indicating devices, such as, for example and not by way of limitation, a projector having a ground-glass screen or a projector utilizing a wall screen.

While we have shown and described the preferred embodiments of our invention, it will be understood that various changes may be made in the idea or principles of the invention within the scope of the appended claims.

Having thus described our invention, what we claim and desire to secure by Letters Patent, is:

1. Apparatus of the character described comprising, a chromatography column having an inlet and an outlet, means for supplying an eluting liquid to said inlet of the column, means for supplying a reagent to the liquid discharged from the outlet of said column for mixture with the discharged liquid to modify the color of the latter while the discharged liquid continues to flow from said outlet of the column, means providing a flow passage for said liquid, colorimeter analysis means through which said liquid flows from said passage, said colorimeter means comprising a plurality of light filters, and drive means for moving said filters in succession into and out of light transmitting relation to each successive portions of said liquid during the flow thereof through said colorimeter means.

2. Apparatus of the character described comprising, a chromatography column having an inlet and an outlet, means for supplying an eluting liquid to said inlet of the column, means for supplying a reagent to the liquid discharged from the outlet of said column for mixture with the discharged liquid to modify the color of the latter while the discharged liquid continues to flow from said outlet of the column, means providing a flow passage for said liquid colorimeter analysis means through which said liquid flows from said passage, said colorimeter means comprising a plurality of light filters, and drive means for moving said filters in succession into and out of light-transmitting relation to each successive portions of said liquid during the flow thereof through said colorimeter means, and a multi-record recorder responsive to the output of said colorimeter means under the control of said plurality of moving light filters.

3. Apparatus for chromatography analysis, comprising a tube for adsorbent material for the components of the liquid to be analyzed to provide a chromatography column, said tube having an inlet and an outlet spaced from each other longitudinally of the tube for the passage of a liquid into the inlet through the column for eluting the adsorbate components from the adsorbent material of the column and for the passage of the eluent through the outlet, a conduit connected to said outlet, means for transmitting an eluting liquid through said column, and thereby forming a stream of eluent liquid containing in successive portions the adsorbate components, respectively, of the liquid under analysis, means operable during the flow of said eluent liquid for treating it for colorimetric analysis, and means having provision for subjecting successive portions of said treated eluent liquid successively to colorimetric analysis during the flow of said eluent stream, said colorimetric analysis means comprising plural color filter means operable to transmit light beams, of a plurality of different wave lengths, respectively, in succession to each of successive portions of said flowing treated eluent liquid.

4. Apparatus for chromatography analysis, comprising a tube for adsorbent material for the components of the liquid to be analyzed to provide a chromatography column, said tube having an inlet and an outlet spaced from each other longitudinally of the tube for the passage of a liquid into the inlet through the column for eluting the adsorbate components from the adsorbent material of the column and for the passage of the eluent through the outlet, a conduit connected to said outlet, means for transmitting an eluting liquid through said column, and thereby forming a stream of eluent liquid containing in successive portions the adsorbate components, respectively, of the liquid under analysis, means for supplying to said stream of eluent liquid a second liquid predeterminately proportional to the quantity of said eluting liquid for treating said eluent liquid for colorimetric examination, and means having provision for subjecting successive portions of said treated eluent liquid successively to colorimetric analysis during the flow of said eluent stream, said colorimetric analysis means comprising plural color filter means operable to transmit light beams of a plurality of different wave lengths, respectively, in succession to each of successive portions of said flowing treated eluent liquid.

5. Apparatus for chromatography analysis, comprising a tube for adsorbent material for the components of the liquid to be analyzed to provide a chromatography column, said tube having an inlet and an outlet spaced from each other longitudinally of the tube for the passage of a liquid into the inlet through the column for eluting the adsorbate components from the adsorbent material of the column and for the passage of the eluent through the outlet, a conduit connected to said outlet, means for transmitting an eluting liquid through said column, and thereby forming a stream of eluent liquid containing in successive portions the adsorbate components, respectively, of the liquid under analysis, means operable during the flow of said eluent liquid for treating it for colorimetric analysis, and means having provision for subjecting successive portions of said treated eluent liquid successively to colorimetric analysis during the flow of said eluent stream, said colorimetric analysis means comprising a flow cell through which the treated eluent flows, a source of light, a plurality of light filters of different light transmission characteristics, respectively, disposed between said light source and said flow cell and mounted for movement into and out of the path of light from said source to said cell, and means for moving said light filters in succession into and out of said light path for subjecting each successive portion of the eluent liquid in said flow cell to light beams of a plurality of different wave lengths, respectively.

6. The method of chromatographic analysis according to which a liquid to be analyzed is introduced into a tube having an adsorbent material therein to provide a chromatography column in which the adsorbate components of said liquid are stratified in accordance with their respective affinities for the adsorbent material, said method comprising transmitting a stream of eluting liquid through said chromatography column and continuously discharging the eluent from said column, concurrently treating the discharged eluent, as it is discharged from the column, for colorimetric examination, and concurrently subjecting the stream treated eluent to colorimetric examination, including subjecting each successive portion of the stream of treated eluent to a plurality of beams of light of different wave lengths, respectively.

7. The method of chromatographic analysis according to which a liquid to be analyzed is introduced into a tube having an adsorbent material therein to provide a chromatography column in which the adsorbate components of said liquid are stratified in accordance with their respective affinities for the adsorbent material, said method comprising transmitting a stream of eluting liquid through said chromatography column and continuously discharging the eluent from said column, concurrently introducing the discharged eluent into a stream of liquid for treating said eluent for colorimetric examination, and concurrently transmitting said stream of treating liquid and eluent through a colorimeter, including subjecting each successive portion of the stream of treated eluent to a plurality of beams of light of different wave lengths, respectively.

References Cited in the file of this patent

UNITED STATES PATENTS

| | | |
|---|---|---|
| 1,943,684 | Martin et al. | Jan. 16, 1934 |
| 2,152,645 | Holven et al. | Apr. 4, 1939 |
| 2,692,820 | Alway et al. | Oct. 26, 1954 |
| 2,696,750 | Hunter | Dec. 14, 1954 |
| 2,710,715 | Gorham | June 14, 1955 |
| 2,797,149 | Skeggs | June 25, 1957 |

FOREIGN PATENTS

| | | |
|---|---|---|
| 133,951 | Sweden | Dec. 18, 1951 |